(12) United States Patent (10) Patent No.: US 9,131,016 B2
Glueckman et al. (45) Date of Patent: Sep. 8, 2015

(54) METHOD AND APPARATUS FOR VIRTUAL AUDITORIUM USABLE FOR A CONFERENCE CALL OR REMOTE LIVE PRESENTATION WITH AUDIENCE RESPONSE THERETO

(76) Inventors: Alan Jay Glueckman, Davenport, FL (US); Gail Susan Kantor, Valley Village, CA (US); William Gibbens Redmann, Glendale, CA (US)

( * ) Notice: Subject to any disclaimer, the term of this patent is extended or adjusted under 35 U.S.C. 154(b) by 1500 days.

(21) Appl. No.: 11/900,232

(22) Filed: Sep. 11, 2007

(65) Prior Publication Data

US 2009/0067349 A1 Mar. 12, 2009

(51) Int. Cl.
  G06F 15/173 (2006.01)
  H04L 29/06 (2006.01)
  H04H 20/71 (2008.01)
  H04H 40/00 (2009.01)

(52) U.S. Cl.
  CPC ........ H04L 65/4015 (2013.01); H04L 65/1059 (2013.01); H04L 65/4053 (2013.01)

(58) Field of Classification Search
  CPC ......... H04N 7/147; H04N 7/15; H04N 7/157; H04N 21/4143; H04M 3/56; H04M 2203/553; H04M 3/42357; H04M 7/00; H04M 3/5315; H04M 3/567; H04L 67/104; H04L 65/4015; H04L 29/06027; H04L 67/42; H04L 45/00; H04L 65/1006; H04L 65/608; H04L 67/1091; H04L 12/1822; H04L 45/64; H04L 47/824; H04L 65/1016; H04L 65/403; H04L 65/4069; H04L 65/4084
  USPC ............ 379/202.01, 203.01, 204.01, 205.01, 379/206.01; 455/416; 370/260, 261, 262, 370/263, 264, 265; 348/14
  See application file for complete search history.

(56) References Cited

U.S. PATENT DOCUMENTS

| | | | | |
|---|---|---|---|---|
| 6,840,496 | B2 * | 1/2005 | Maercovich et al. | 251/129.03 |
| 6,850,496 | B1 * | 2/2005 | Knappe et al. | 370/260 |
| 6,973,184 | B1 * | 12/2005 | Shaffer et al. | 379/420.01 |
| 7,197,126 | B2 * | 3/2007 | Kanada | 379/202.01 |
| 7,839,803 | B1 * | 11/2010 | Snelgrove et al. | 370/260 |
| 8,208,477 | B1 * | 6/2012 | Xiong et al. | 370/400 |

(Continued)

OTHER PUBLICATIONS

Boris Mejías, Donatien Grolaux, Peter Van Roy; Improving the Peer-to-Peer Ring for Building Fault-Tolerant Grids; CoreGRID Workshop on Grid Programming Model; Jun. 2006; FORTH-ICS; Heraklion, Greece, (copy attached, see p. 3).

(Continued)

*Primary Examiner* — Fan Tsang
*Assistant Examiner* — Kharye Pope

(57) ABSTRACT

A method and apparatus are disclosed for providing a virtual auditorium for a remote, live performance to a remote, distributed audience, wherein the performers receive the reaction of the audience members in substantially real time. The live performance can itself be distributed geographically, as taught in the prior art, and may be multimedia in nature, for example audio (monophonic, stereo, or multi-channel) can be augmented by images, video, MIDI, text (e.g., commentary, lyrics), etc. Further, the distributed audience members can receive each other's reaction, also in substantially real time, whereby the virtual auditorium is created wherein the distributed audience members constitute a virtual assembly.

The same virtual auditorium, sans performers, can be used as a venue to conduct a conference call of arbitrary size without the expense of a central voice bridge.

32 Claims, 8 Drawing Sheets

(56) References Cited

U.S. PATENT DOCUMENTS

| | | | |
|---|---|---|---|
| 8,504,733 B1* | 8/2013 | Iyer et al. | 709/252 |
| 2004/0034723 A1* | 2/2004 | Giroti | 710/8 |
| 2005/0024484 A1* | 2/2005 | Leonard et al. | 348/14.01 |
| 2005/0074107 A1* | 4/2005 | Renner et al. | 379/202.01 |
| 2005/0187946 A1* | 8/2005 | Zhang et al. | 707/100 |
| 2005/0237952 A1* | 10/2005 | Punj et al. | 370/260 |
| 2005/0286443 A1* | 12/2005 | McMillen et al. | 370/260 |
| 2006/0067500 A1* | 3/2006 | Christofferson et al. | 379/202.01 |
| 2006/0132595 A1* | 6/2006 | Kenoyer et al. | 348/14.08 |
| 2006/0209728 A1 | 9/2006 | van der Gaast | |
| 2006/0210045 A1* | 9/2006 | Valliath et al. | 379/202.01 |
| 2006/0256738 A1* | 11/2006 | Kenoyer et al. | 370/260 |
| 2007/0002778 A1* | 1/2007 | Shi et al. | 370/260 |
| 2007/0002869 A1* | 1/2007 | Miller | 370/395.32 |
| 2007/0025538 A1* | 2/2007 | Jarske et al. | 379/202.01 |
| 2007/0041366 A1* | 2/2007 | Vugenfirer et al. | 370/352 |
| 2007/0058631 A1* | 3/2007 | Mortier et al. | 370/392 |
| 2007/0140456 A1* | 6/2007 | Rodman et al. | 379/202.01 |
| 2007/0223675 A1* | 9/2007 | Surin et al. | 379/202.01 |
| 2007/0230482 A1* | 10/2007 | Shim et al. | 370/400 |
| 2007/0279484 A1* | 12/2007 | Derocher et al. | 348/14.09 |
| 2007/0291667 A1* | 12/2007 | Huber et al. | 370/260 |
| 2008/0082628 A1* | 4/2008 | Rowstron et al. | 709/217 |
| 2008/0129816 A1* | 6/2008 | Mattila et al. | 348/14.08 |
| 2008/0144794 A1* | 6/2008 | Gardner | 379/202.01 |
| 2008/0159507 A1* | 7/2008 | Virolainen et al. | 379/202.01 |
| 2008/0192109 A1* | 8/2008 | Valenzuela et al. | 348/14.08 |
| 2008/0260132 A1* | 10/2008 | Zhang et al. | 379/202.01 |
| 2009/0262668 A1* | 10/2009 | Hemar et al. | 370/260 |

OTHER PUBLICATIONS

Ghodsi, Ali; Distributed k-ary System: Algorithms for Distributed Hash Tables; PhD dissertation; Dec. 2006; Royal Institute of Technology, School of Information and Communication Technology, Department of Electronic, Computer, and Software Systems; Stockholm; Sweden (copy attached, see p. 29-30, 63-72, and esp. 116-122).

* cited by examiner

METHOD AND APPARATUS FOR VIRTUAL AUDITORIUM USABLE FOR A CONFERENCE CALL OR REMOTE LIVE PRESENTATION WITH AUDIENCE RESPONSE THERETO

FIELD OF THE INVENTION

The present invention relates generally to a communication system for assembling a distributed live audience. More particular still, the invention relates to a system for permitting an audience of a multimedia presentation to exchange their responses with each other and/or with one or more performers.

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO COMPUTER PROGRAM LISTING APPENDICES

Not Applicable

BACKGROUND OF THE INVENTION

In U.S. patent application Ser. No. 11/545,926, ('926) Redmann teaches a mechanism enabling remotely situated musicians to collaborate using acoustic instruments thereby creating a remote or distributed performance.

The '926 system operates by capturing acoustic signals generated by the locally performing musician, e.g. from his microphone or electric guitar output. The resulting electronic audio stream is sent to each of two places: First, and immediately, to all of the remote musicians via a communication channel. The communication channel can be one or more voice telephone lines, but is preferably a packet network connection, for example comprising the Internet. Second, to a local buffer having a delay substantially the same amount of time as the communication channel has latency to the others. Upon arrival at the remote location(s), substantially coincident with the local delay elapsing, the audio is played at each of the stations substantially simultaneously; i.e., a brief moment following the original performance. The originating musician listens to his own performance with the local delay, preferably through headphones.

However, the '926 system suffers from one significant drawback: The musicians have no audience. Other than those participating in the peer-to-peer interconnection that comprises the jam, there is no audience.

Further, were any audience members to be collocated with a musician participating in a jam, there is no separation between their utterances such as cheering, applause, and the like, and the performance itself.

Further still, the interconnection mechanism of the '926 system is optimized for low latency, but at the cost of a complete interconnection among the jam participants, which places an increased bandwidth requirement on each participant for each additional peer added to the jam. In such a scenario, a large number of audience members would produce an untenable bandwidth requirement for individual performance stations under '926.

Conference call systems exist which allow a presenter to be heard by all call participants. Some systems permit other call participants to be heard by everyone as well. Often, such conference calls are implemented with expensive voice bridges. However, there are network-based telephone applications, such as Skype by eBay, Inc of San Jose, Calif., which are implemented using VoIP technology, and which can provide conference calls in small numbers, in the case of Skype up to about five people without a separate voice bridge server. However, for large numbers of participants able to hear each other, voice bridge servers require significant network infrastructure and large amounts of centralized bandwidth. Products such as Skype that run on personal computers are, to date, significantly limited in the count of participants.

Separately, classes of self-organizing peer-to-peer networks have been developed. Of particular interest is the Distributed Hash Table, or DHT. The principles and exemplary uses of DHTs are described by Ali Ghodsi in *Distributed k-ary System: Algorithms for Distributed Hash Tables*, his PhD dissertation to the Royal Institute of Technology, School of Information and Communication Technology, Department of Electronic, Computer, and Software Systems, Stockholm, Sweden, December, 2006. Distributed Hash Tables, also known as structured overlay networks, (SON), are well suited to building scalable, self-managing distributed systems.

A different, but related organizing principle is taught by Boris Mejías, et al, of Université catholique de Louvain, Belgium, in *Improving the Peer-to-Peer Ring for Building Fault-Tolerant Grids*, CoreGRID Workshop on Grid Programming Model, Grid and P2P Systems Architecture, Grid Systems, Tools, and Environments, FORTH-ICS, Heraklion, Greece, Jun. 12-13, 2007.

These peer-to-peer overlay networks provide algorithms that permit an ad hoc group of stations, each of which only needs to know how to connect to at least one station already in the organization, to interconnect and manage their organization. Such peer-to-peer organizations have not previously been shown to support a virtual auditorium environment. However, the capabilities for self-organization and self-maintenance is exploited in the present invention to achieve an interconnection of nodes streaming multimedia among themselves without excessive investment in server capacity and bandwidth being required from any central server.

Thus there remains a need for a way to permit audience members, preferably in large numbers, to listen to a live performance such that the performers experience the response (e.g., applause, shout-outs, laughter, etc.) of the audience, in substantially real time. Such an audience may extend across neighborhoods, cities, states, continents, and even across the globe.

There is a further need to admit to such an audience individuals having a right to attend, such as holding a ticket or subscription.

There is a further need for the audience to receive the live performance reliably and resiliently, for instance in the case of commonplace disruptions in a network such as the Internet or as might be induced by the unanticipated removal of a peer from an organization of stations.

The present invention satisfies these and other needs and provides further related advantages.

OBJECTS AND SUMMARY OF THE INVENTION

The present invention relates to a system and method for providing a remote, live performance to a remote, distributed audience, wherein the performers receive the reaction of the audience members in substantially real time. The live performance can itself be distributed geographically, as taught in the prior art, and may be multimedia in nature, for example audio (monophonic, stereo, or multi-channel) can be augmented by images, video, MIDI, text (e.g., commentary, lyrics), etc. Further, the distributed audience members can receive each other's reaction, also in substantially real time, whereby a virtual auditorium is created wherein the distributed audience members constitute a virtual assembly.

The same virtual auditorium can be used as a venue to conduct a conference call.

The performance may be pre-recorded, as with a movie, but the audience can still share a joint reaction, as if they were in a real theatre. Applied to television programming, this could alleviate the need for live studio audiences and laugh tracks (canned laughter used to indicate to an audience that an actor's line was funny).

To participate as an audience member, a person uses a broadband network connected computer, which may be mobile, to join a peer-to-peer network of the prior art. Peers in the network cooperate to organize a hierarchy of audience nodes. This audience hierarchy is interconnected in such a way as to allow a presentation to flow from a root node (herein designated as the engineer/server node) to all directly connected audience nodes, and from those audience nodes to the audience nodes of the next hierarchical layer, and so on. By this mechanism, no audience node is required to have extraordinary communication resources, yet the audience can grow arbitrarily large. Further, by permitting each audience member to respond to the presentation (e.g., applause, cheer, heckle, etc.) and to send that audience response in both directions: up and down the hierarchy, such response can be received by all members of the audience. This has an amplifying effect on the behavior of the audience.

Since all audience members can receive the reaction of all other audience members, this structure can also be used to implement a conference call. In such a use, no performance (live or otherwise) needs to be provided, and the engineer/server node may be the computer of the call organizer.

It is an object of the present invention to provide such a virtual auditorium with commonplace communications capabilities (e.g., a single personal computer having only a residential class Internet connectivity, or a mobile device having a WiFi connection). It is a further object of the present invention that reliability can be increased by arbitrarily scaling the communications facility and the corresponding bandwidth.

Still further, it is an object of the present invention to be able to simulate the behavior of an actual auditorium, wherein the response of an audience member adjacent to you can be distinctly heard, whereas the shouts from another audience member might be lost in the murmur of the crowd unless the crowd is substantially quiet.

Another object of the present invention is to permit conference calls of substantial numbers of participants to be assembled without the need for dedicated voice bridge servers or hardware, or indeed any significant expense on the part of the participants.

These and other features and advantages of the invention will be more readily apparent upon reading the following description of a preferred exemplified embodiment of the invention and upon reference to the accompanying drawings wherein:

BRIEF DESCRIPTION OF THE DRAWINGS

The aspects of the present invention will be apparent upon consideration of the following detailed description taken in conjunction with the accompanying drawings, in which like referenced characters refer to like parts throughout, and in which.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE INVENTION

The present invention provides distribution of an audio and/or visual performance to an audience in substantially real-time, and accepts an audio response from members of the audience, also substantially in real-time, and provides such response to the distribution point and the performers.

Figure 1:
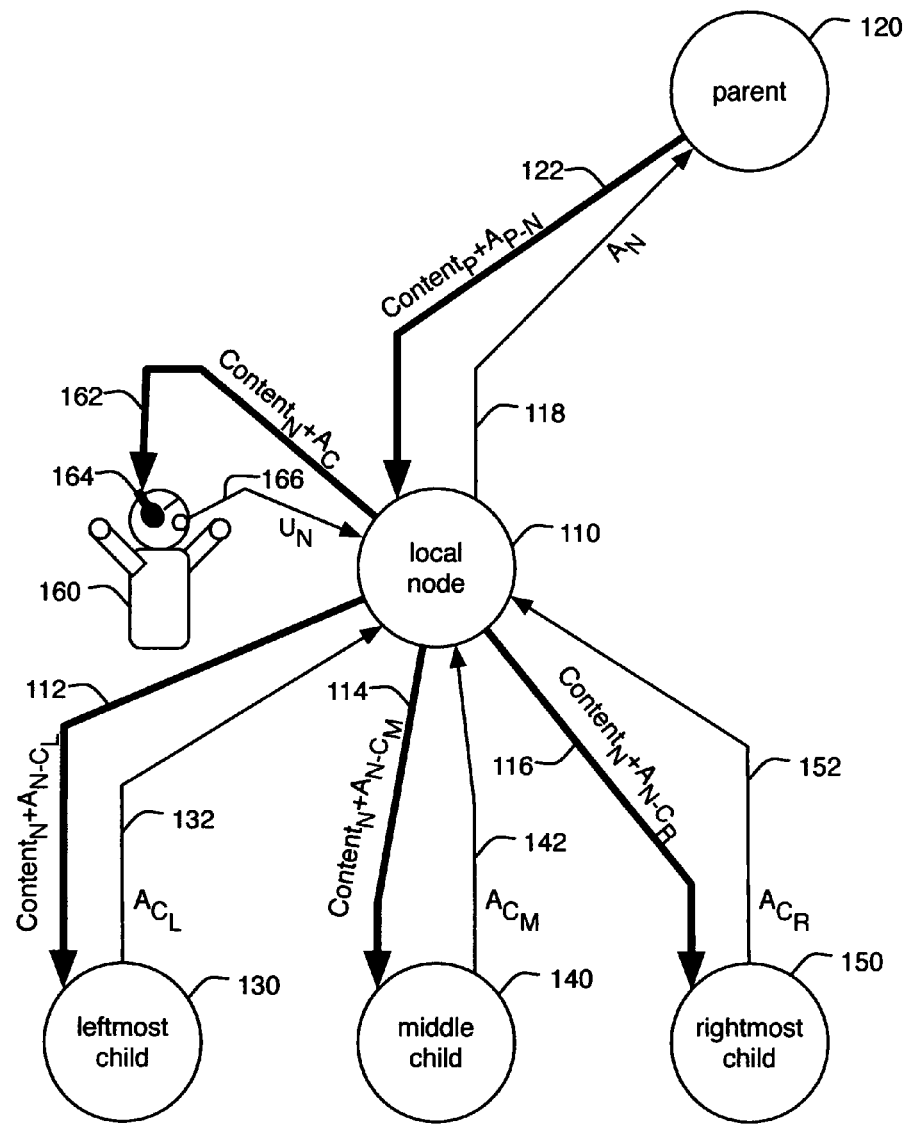
FIG. 1 is a block diagram showing signals exchanged between an audience node and other nodes during a performance.

Referring to FIG. 1, an audience node 110 suitable for implementing the present invention is shown. A live performance is received from the parent node 120. The performance is designated as $Content_P$ and is delivered over connection 122. A significant function of local audience node 110 is that the content signal is shared with the zero or more child nodes 130, 140, and 150, here and throughout illustrated as not more than three, thus imbuing local audience node 110 with a fanout of three.

Audience node 110 is preferably implemented by a personal computer, where audience hierarchy interconnections 122, 112, 114, 116, 118, 132, 142, and 152 are all logical IP network connections running a VoIP or other streaming protocol for exchange of audio or other multimedia signals. Preferably, these connections provide low latency, high reliability, and high bandwidth. Typically, these connections are established over a single physical connection to a network service provide, for instance through a wireless, DSL, or cable modem (not shown).

Audience response $A_N$ from local node 110 and its zero or more child nodes 130, 140, 150 is sent to parent node 120 over response connection 118. Audience response $A_N$ comprises audience response $U_N$ from local audience member 160, which enters local node 110 through input 166, which typically comprises a microphone or other transducer (e.g., a guitar pickup) as needed to format the response of user 160 for use by the system. Thus, response $A_N$ from local node 110 can be implemented according to Equation 1:

$$A_N = U_N + A_{C_L} + A_{C_M} + A_{C_R}$$

Where the three separate $A_C$ signal components are audience responses from the three (left, middle, and right) exemplary child nodes 130, 140, 150.

The collective response to local node 110 from child nodes 130, 140, 150 can be implemented according to Equation 2:

$$A_C = A_{C_L} + A_{C_M} + A_{C_R}$$

Each of these child nodes is implemented in the same manner as local node 110, and so what is an $A_C$ signal to local node 110, is the $A_N$ signal from the perspective of the corresponding child node.

Parent node 120 may have children besides local node 110, and since parent node 120 may have an audience member analogous to local audience member 160, parent node 120 may be in receipt of audience response signals besides audience response signal $A_N$ sent over connection 118 by local node 110. Such audience response known to the parent is provided to local node 110 over connection 122, but this preferably excludes signal $A_N$. Thus, over connection 122, the audience response signal component provided from parent node 120 is $A_{P-N}$.

A similar sum is made for audience response received at local node 110 and passed on to the child nodes 130, 140, and 150 over connections 112, 114, and 116 respectively, and are as shown in Equations 3, 4, and 5:

$$A_{N-C_L} = U_N + A_{C_M} + A_{C_R}$$

$$A_{N-C_M} = U_N + A_{C_L} + A_{C_R}$$

$$A_{N-C_R} = U_N + A_{C_L} + A_{C_M}$$

In the case of each Equation 3, 4, and 5, the audience responses generated at local node 110 or received from its child nodes are summed, except for the contribution of the individual child nodes to which the corresponding signal is sent.

Collectively, the content and audience signals from the parent node 120 are referenced within local node 110 as Content$_N$, which may be expressed as Equation 6:

$$Content_N = Content_P + A_{P-N}$$

Such content and audience response signals can comprise a single or multi-channel audio stream, typically stereo. It is preferable that content signals comprise a video stream, for instance to show live images of a band as they perform, or in the case of a motion picture score or music video, a live performance may be made in response to the imagery. Additionally, the content or audience response streams may comprise text (e.g., lyrics), MIDI data (Musical Instrument Digital Interface) events, or control signals (e.g., for remotely setting mixer volumes or noise gate levels). In a case where Content$_P$ comprises a video component, then output transducer 164 preferably comprises a video display (not shown).

The presentation provided to local audience member 160 is preferably a combination of the Content$_P$, the audience reaction $A_{P-N}$ provided through parent node 120, and the audience reaction $A_C$ provided collectively by the child nodes 130, 140, 150 per Equation 2. The combination of Content$_P$ and $A_{P-N}$ from the parent is collectively identified as Content$_N$ and the further combination with audience reaction $A_C$ produces the program to be provided to local audience member 160 by output 162, the program being rendered by output transducer 164 (shown in the preferred embodiment as headphones).

In the preferred embodiment, the overall audience response is represented to the local user 160 as a stereo stream on output 162. Within the local node 110 the audience response signal on connection 132 from the left child node 130 is panned to the left channel, the audience response signal on connection 152 from the right child node 150 is panned to the right channel, and the audience response signal on connection 142 from the middle child can be center-panned, to appear equally on the left and right channels. The audience response portion of the signal on connection 122 from parent node 120, if monophonic, can be center panned, but preferably that portion of the signal on connection 122 comprising $A_{P-N}$ is stereophonic. Either way, a simulated spatial relationship among all audience members is formed. Those skilled in the art will appreciate that further spatialization of the audience response can be achieved with additional sound presentation channels, such as achieved with surround sound techniques.

Note that the signal on connection 122 may be a combination of Content$_P$ and $A_{P-N}$ as in a single, mixed and inseparable signal preferably provided in stereo, but allowably in a monophonic format. In an alternative embodiment, the audience response portion of the signal on connection 112 remains distinct and is separately managed from the content signal Content$_P$. Such a separation allows local user 160 to use local controls (not shown) to adjust the mix of the performance delivered in Content$_P$ and the audience response that is heard. Note that audience response signals from the child nodes received over connections 132, 142, and 152 are already separate.

Local node 110 is responsible for passing to child nodes 130, 140, and 150 the content stream Content$_P$ and preferably the audience response signals of which local node 110 is in receipt, with the exception of those audience response signals received from the corresponding child node. These signals would correspond to the sum of Equation 6 and one of Equations 3, 4, and 5, which correspond to one of child nodes 130, 140, and 150, respectively. For example, the audience response portion of the signal on connection 112 to leftmost child 130 does not repeat back to child node 130 any of left child audience response signal received through connection 132. However, in an alternative implementation, the passing of audience response can be to only parent node 120, per Equation 1.

In still another embodiment, the signals from nodes other than local node 110 may be attenuated by coefficients (not shown) on each term in Equations 1, 3, 4, and 5. In this way, a spatial relationship among the nodes surrounding local node 110 is simulated. If parent node 120 hosted an audience member (not shown) who provided audience response similar to that of audience member 160, then audience member 160 would perceive that response unattenuated, however corresponding audience members (not shown) hosted at child nodes 130, 140, or 150 would hear that component of the parent audience response more quietly—simulating the audience member at the parent node 120 being farther away than audience member 160 at local node 110, whose response on input 166 would be unattenuated for child nodes 130, 140, and 150. Other coefficients on the terms of Equations 1-5 may be selected to achieve different effects of audience and content mixing without departing from the spirit of the present invention. Further, the individual audience response signals may remain completely or partially distinct from each other or from content signals, again to achieve different effects or to allow audience member 160 a broader range of controls (not shown) such as the ability to increase or decrease the relative volume of the content to the audience response.

Also, a dynamic range control may be implemented, where in while the level of aggregate audience response is low, the gain (coefficient) on the local audience member response signal may be higher. As the audience response grows, that gain can be reduced. The effect can be used to ensure that shout outs in a quiet virtual auditorium are propagated well.

In the preferred embodiment, audience responses from all sources are mixed together as described in the literal meaning of Equations 1, 3, 4, and 5. Preferably, these audience response signals are combined with content signals as identified in Equation 6 and FIG. 1. In this way, bandwidth requirements among nodes are minimized. Where bandwidth is a less constrained resource, as it might be, for instance, with a DSL connection, such restrictive combination is required less, and more distinct signals can be exchanged.

All of the inter-nodal streams are preferably compressed with a CODEC to conserve bandwidth. Well-known CODECs for audio include MP3 and AC3. Unlike the latency-critical timings taught in '926, the latencies of content sent to the audience nodes is less critical. Unlike the short windowed techniques and CODECs preferred in the '926 teachings, for the audience the addition of latency due to a 20 mS, 50 mS, or longer windowed CODEC is not significant. For video, MPEG or video conferencing CODECs can be used. For the purposes of this discussion, those skilled in the art will understand that a decoder (not shown) corresponding to the encoder (not shown) used would be employed upon receipt of a signal and that a suitable encoder is preferably employed on signals sent to other nodes.

Figure 2:
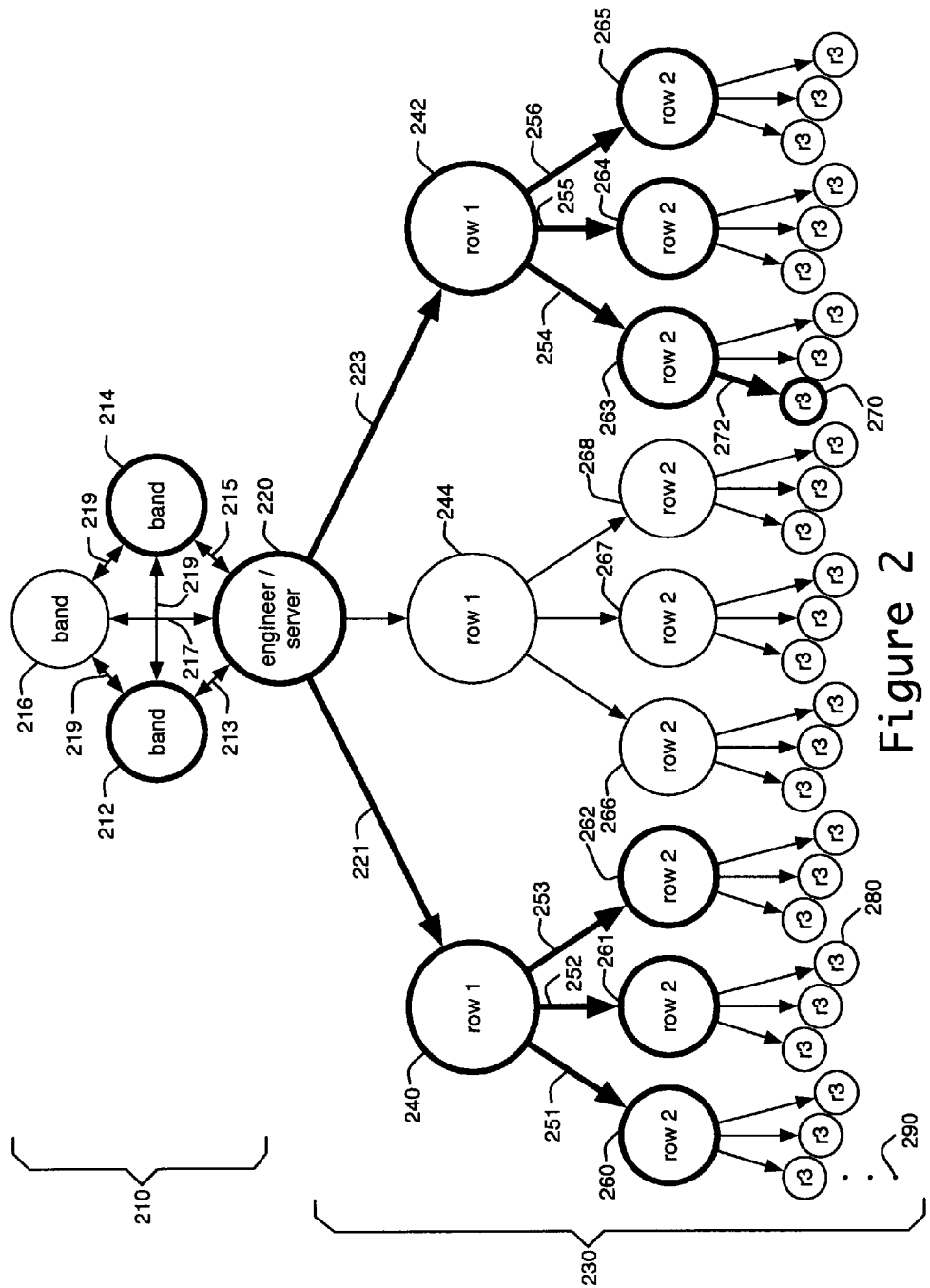
FIG. 2 is a block diagram showing the hierarchy of audience nodes relative to an engineer/server node moderating a performance.

Referring now to FIG. 2, an exemplary hierarchy of nodes for implementing the present invention is shown. Performance nodes 210 include engineer/server node 220. Audience hierarchy 230 includes numerous audience nodes such as 240, 242, 244, 260-268, 280, 270, and additional nodes (not shown) indicated by ellipsis 290. Each node in audience hierarchy 230 behaves as local node 110 and is, in its turn, interconnected with its neighbors as shown in FIG. 1. For example, with reference to audience node 263, the parent node 120 is audience node 242, and leftmost child node 130 is audience node 270. But with reference to audience node 242, the leftmost child node 130 is audience node 263 and the parent node 120 is engineer/server node 220.

Audience nodes such as 240, 242, 244 which are connected directly to engineer/server node 220 are considered to be 'first row' nodes. The children of first row nodes are considered to be 'second row' nodes, such as 260-268, and their child nodes, e.g., 270 and 280 are 'third row' nodes and so on.

Recall that the three-way fanout from audience nodes 230 to their respective child nodes is exemplary, and the actual fanout of any individual audience node will be limited by the bandwidth available to that node and the amount of bandwidth required for the signals into and out of that node. Further, it is not a requirement that all audience nodes provide the same fanout that the others do.

Note that engineer/server node 220 is a bridge between the performance nodes 210 and the audience hierarchy 230. In some way, engineer/server node 220 is a member of both groups, but has properties unique among the nodes. While the functions of engineer/server node 220 can be distributed among multiple physical devices which may be collocated or remote from each other (an example of which is given in conjunction with FIG. 5), it is useful to discuss the operation of engineer/server node 220 as a single entity.

Engineer/server node 220 is so-named for functional roles it fills. The engineer role is analogous to a studio engineer or concert engineer's job. A person performing such a job is responsible for mixing the audio, for setting levels at which the band is heard, so that the audience response does not swamp out the performance. A studio engineer is responsible for operating the recording equipment to ensure that a clean record of the performance is captured. This task is more challenging in a live environment, where audience response must be included and managed, as too much or too little may aesthetically harm the live performance and/or the recording thereof.

An engineer (not shown) at node 220 will preferably have controls (not shown) that are able to adjust the ratio between the audience response and the performance content. Alternatively, this ratio can be fixed or can be a function, for example, of how many nodes participate in the audience or how many 'rows back' an audience node is in the audience hierarchy 230.

In the role of server, node 220 can be a station having reliability and bandwidth beyond that of a typical personal computer implementing a node in audience hierarchy 230.

In particular, in the role of server, should node 220 have substantially more bandwidth available than audience nodes in audience hierarchy 230, then a correspondingly higher fanout $F_S$ should be available. If $F_N$ is the fanout of a typical audience node and R is the number of rows in the audience, then a maximum audience size $Max_A$ is computed with Equation 7:

$$Max_A = F_S \times F_N^{(R-1)}$$

What can be shown with Equation 7 is that for $F_S > F_N$, that $Max_A$ serves a larger audience with the same number of rows. From FIG. 2, it is clear that audience nodes 240, 242, and 244 in the first row receive their content from the performance nodes 210 through only engineer/server node 220, with no dependence on other audience nodes. Audience nodes 260-268 in the second row and 270, 280 in the third and nodes 290 in rows beyond, depend on audience nodes in prior rows interconnected in the fashion of parent node 120, such that a chain of connections is made up to the engineer/server node 220. The reliability of that chain of connections remaining stable is proportional to the number of intervening audience nodes. Where $F_S = c\ F_N$, the number of rows required for a given number of audience nodes is roughly $\log_{F_N}(c)$, that is, when $F_S = F_N$; c=1; and the maximum number of rows required is reduced by 0. Where $F_S = 3F_N$; c=3; and the maximum number of rows required is reduced by 1. when $F_S = 9F_N$; c=9; and the maximum number of rows required is reduced by 2. Commensurate with a reduction in maximum row count is a reduction in maximum latency, also an advantage.

In an alternative embodiment, given that engineering/server node 220 is responsible for communicating with each of band nodes 212, 214, 214, it may be that the communications bandwidth available to engineering/server node 220 is limited, and $F_S$ may be kept small to stay within those limits. At the least, $F_S$ can be one, in which case the implementation relies entirely on the fanout of the audience nodes to communicate to the audience hierarchy.

While the functional roles of engineer and server for engineer/server node 220 can be implemented economically in a single station, the roles can also be divided among separate machines in a distributed implementation of engineer/server node 220. Both kinds of implementation are discussed below.

The performance nodes 210 preferably comprise a distributed performance such as the remote real time collaborative acoustic performance or online audio jamming group, as described in '926 patent. These band members can perform together using performer nodes 212, 214, 216 interconnect using the techniques described in '926 to manage the network latency and remain in sync with each other. The engineer/ server node 220 is preferably a station of the '926 description, and is thereby in full communication with the other jam members. It is up to engineer/server node 220 to take the signals from performer nodes 212, 215, and 216 received over connections 213, 215, and 217, synchronize then according to the techniques of the '926 patent, including any contribution to the performance produced by a performance at engineer/server node 220, and provide the synchronized signal to the audience hierarchy 230, for example through connection 221 to first row node 240.

While the same protocols and CODECs employed among the performance nodes 210 may be used among the other nodes, the same constraint for low latency does apply to the audience hierarchy 230. For this reason, engineer/server node 220 may employ a CODEC whose quality or compression properties are preferred, even though the CODEC may introduce a degree of latency not suitable for use by the band's low latency interconnections 219 among themselves.

In an alternative embodiment, the band or a single performer may perform using a single performance station 212. In this way, even a live performance by a band at a single location or soloist, can be made available to a live online audience. In still another embodiment, this single performance station functionality could be integrated into the engineer/server node 220.

If the band members are distributed among the performance nodes 210 as shown in FIG. 2, or if the band is all together using a single performance station (or there is a solo performer), then the connection to audience hierarchy 230 provides the band access to a live, reactive, distributed, online audience.

Figure 3:
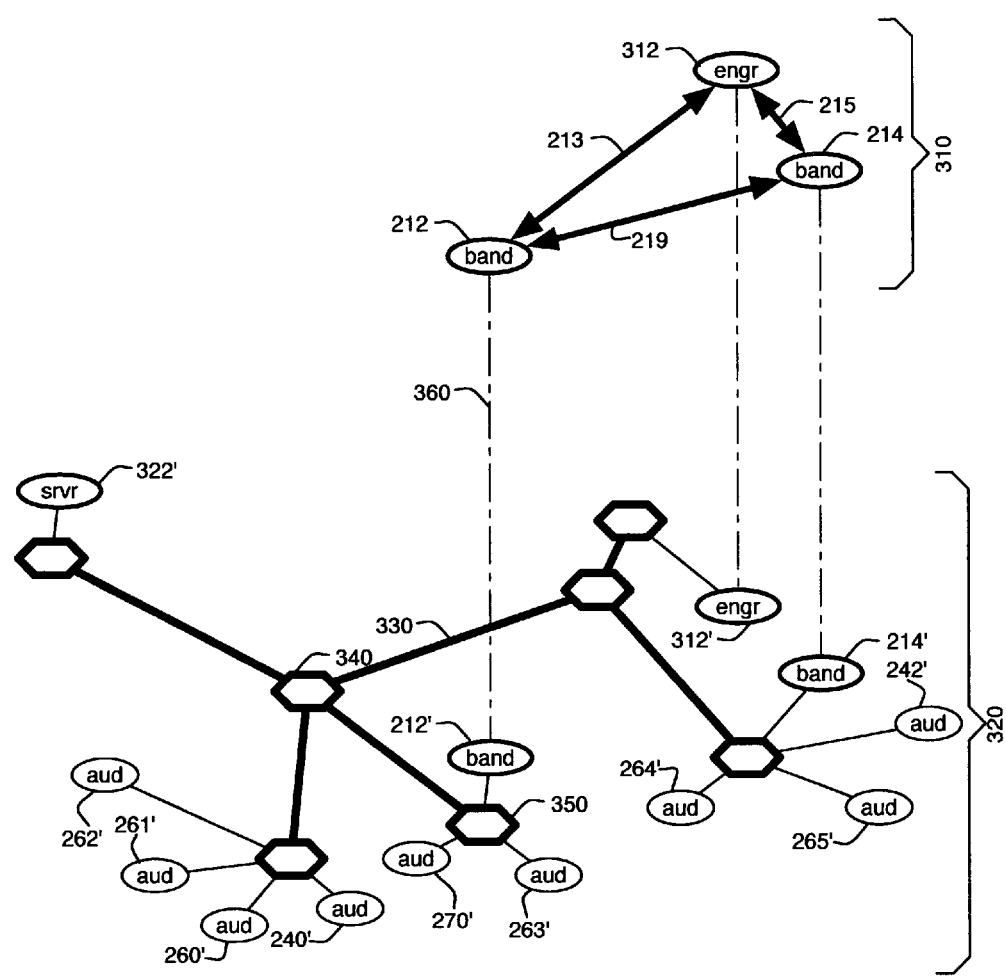
FIG. 3 shows an exemplary underlying physical network topology in relation to a logical organization of nodes for performers and engineer members.

FIG. 3 shows the topology of physical network 320, a portion of a wide-area network (WAN). The portion of the WAN which physical network 320 represented is that portion involved in supporting a live performance of the present invention. High bandwidth connections such as connection 330 are drawn as bold lines. Routers 340 and 350 are shown as hexagons. Router 340, for instance has connections similar to 330, which only connect to other routers. Router 350 connects end user stations to the network. Router 350 may be a telephone company or cable television office supplying DSL or cable modem connections, or it may be a WiFi, WiMax, or other node allowing wireless connections, or any other technology permitting stations 270' and 263' to connect to the WAN. Physical network 320 preferably comprises the Internet. Each station 240', 242', 260', 261', 262', 263', 264', 265', 270' corresponds to respectively numbered audience nodes shown in FIG. 2 and elsewhere. Stations 212' and 214' correspond to respectively numbered performance nodes 210 from which band members are participating. In this drawing, the engineering/server node 220 is implemented entirely at station 312'.

In the upper portion of FIG. 3, the logical performance nodes 310 are shown, with their interconnections. Engineer node 312 communicates with each band member's performance node 212 and 214 over connection 213 and 215 respectively. Performance nodes 212 and 214 communicate with each other over connection 219. Each logical connection 213, 215, and 219 is established over the physical network topology 320 in manners well known: For instance, connection 219 may be implemented with UDP/IP messages or a TCP/IP connection from physical station 212' to router 350, to router 340, across backbone 330, to another router, and so on, until station 214' is reached. Such techniques are well known in the field.

The correspondence between a logical node such as band member performance node 212 and the physical station 212' with a topological location within physical network 320 is shown by vertical projection line 360 which runs between groupings 310 and 320 of the FIG. 3 to show the identity correspondence between elements of the different groups. This illustrative technique is also used in FIGS. 4, 5, and 6, but will not be further commented upon.

Also shown in FIG. 3 is a network location 322' of a server which may provide login services for band and/or audience members. For example, if the ability to be a band member among performance nodes 210 is a service offered for sale or otherwise restricted, then a station such as 214' may need to register through a server 322' before being connected to other band members or the engineer/server node 312. Similarly, if membership in the audience hierarchy 230 is a service for sale (e.g., a ticketed event) or otherwise restricted (e.g., private performance), then a station such as 262' would need to register through server 322' before joining the audience hierarchy 230.

Note that, as a visual aid in comparing the information in FIGS. 2 and 3, certain nodes and connections in FIG. 2 are in bold, for instance node 212 and connection 213. The bold nodes and connections highlight which elements shown in FIG. 2 are used in subsequent figures, such as FIG. 3 to emphasize how the shape of the hierarchy and organization in FIG. 2 corresponds and is implemented by the structures in subsequent figures. Note in particular that node 244 and its descendents are not bolded in FIG. 2 and are not found subsequently. Nor is performer node 216, nor any third row audience node with the sole exception of node 270.

Figure 4:
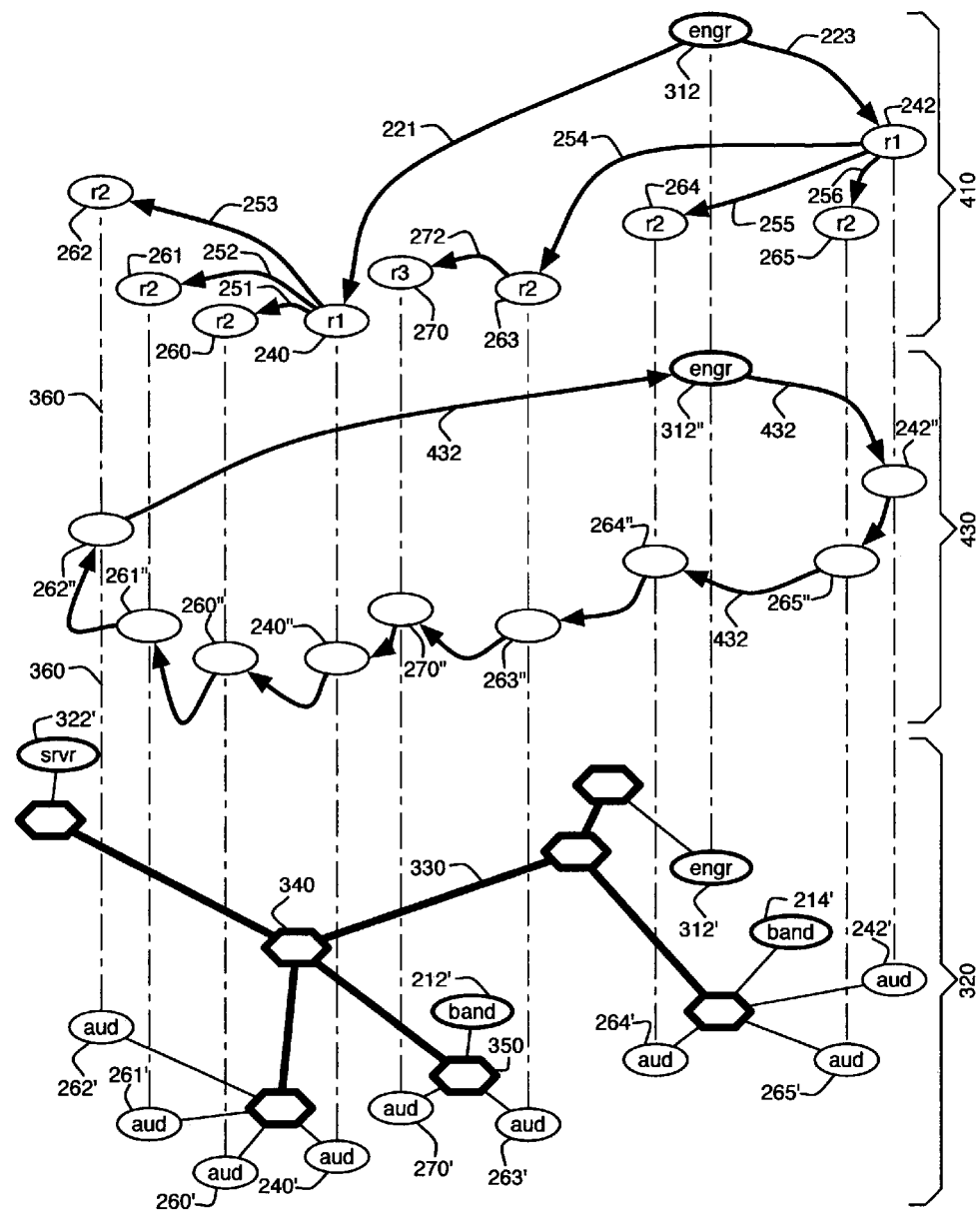
FIG. 4 shows the same underlying physical network topology in relation to a hierarchy of audience nodes for audience members, and an intermediate distributed organizational layer.

Turning now to FIG. 4, the above statements should be clear. The effective audience hierarchy 410 is comprised of audience nodes 240, 242, 260-265, 270, and connections 221, 223, 251-256, 272, and with engineer/server node 312 being the implementation of engineer/server node 220, the bold portion of audience hierarchy 230 of FIG. 2 is reproduced. Each node in the effective audience hierarchy 410 corresponds to a station in the physical network 320 shown at the bottom of FIG. 4, as indicated by corresponding numbers 240', 242', 260'-265', 270', 312'.

Between the upper grouping of the effective audience hierarchy 410 and the lower grouping of physical network 320 is shown a preferred organizing structure, a distributed hash table (DHT) ring 430.

Each DHT node corresponds to an audience hierarchy node of corresponding number: 240, 242, 260-265, 270; or to the engineer/server node 312.

In DHT ring 430, successor pointers 430 are shown which link each of the DHT nodes 240", 242", 260"-265", 270", and 312" into the ring. For simplicity, not shown are the predecessor pointers used for ring maintenance and successor list pointers used for ring stabilization, both as taught by Ghodsi (op cit, p 29-30).

In FIG. 4, audience hierarchy 410 is the audience hierarchy 230 applied to the audience stations 240', 242', 260'-265', 270', and engineer/server station 312' of WAN topology 320.

Well-known algorithms exist, and are taught by Ghodsi (op cit, p 63-72), for DHT nodes to join or leave DHT ring 430. These algorithms employ the successor pointers 432 shown, and the predecessor pointers (not shown). These algorithms ensure that, barring failure of a node or network element in the underlying WAN topology 320, routing within the ring never fails, which assures that the communication streams throughout audience hierarchy 410 (which is the audience hierarchy 230 applied to the audience stations 240', 242', 260'-265', 270', and engineer/server station 312' of WAN topology 320).

Further, for use in case of failures of nodes in the DHT ring 430 or communications failures due to breakdowns of the physical network 320, each node maintains a successor list (op cit, p 33-35 & 75-81), sometimes called a 'finger list' or 'finger table'. The first entry in a DHT node's successor list is the node's own successor pointer (shown in DHT ring 430 as successor pointers 432). Thus, the successor of DHT node 265" is 264". Additional entries in this list are required to recover from failures. In the successor list of DHT node 265", for instance, the second entry is preferably a pointer (not shown) to the successor of the successor of node 265", thus, a pointer to node 263". Thus, if DHT node 264" fails unexpectedly, node 265" can figure out how to reconnect the ring. Additional entries in the successor list point to more distance nodes in the succession chain, which permits recovery in many cases of multiple or wide-spread failures.

In order for a station in physical network 320 to join a live performance as an audience member, the station must create a DHT node and join DHT ring 430. To do this, the station must first have information identifying at least one of the DHT nodes already in DHT ring 430. Preferably, that information is available from a well-known, stable source, and is preferably provided by server 322', though another server (not shown) may be used. This configuration process of contacting the well-known source, if needed, and subsequently establishing the connections to join the DHT ring 430 or other organizing entity and subsequently connecting with audience nodes in the audience hierarchy 410 represents a configuration known by, provided to, or created by the station or a combination thereof. An application running on server 322' provides a list of all live performances currently available, each corresponding to a separate DHT ring 430 (only one shown). Once a performance is selected by the user of the station, server 322' may deliver to the station and new DHT node information concerning one or more nodes of the DHT ring 430 corresponding to the selected performance, part of the configuration of the station. Once the new DHT node has joined, the creation of an audience node 110 begins. Initially, newly joining audience node 110 can contact neighboring DHT nodes to find one with an open child position. For example, if station 270' has just joined the DHT ring 430 with DHT node 270", DHT node 270" may contact its predecessor node 263" with a request to join the audience hierarchy 410. In response, since DHT node 263" corresponds to audience node 263 and audience node 263 has no associated child nodes, audience node 263 accepts new audience node 270 and preferably reports that it is in the second row.

From the point-of-view of audience node 270, upon being accepted as a child of parent audience node 263, audience nodes 263 and 270 cooperate to establish connection 272, which represents both an instance of connection 122 delivering content and audience reaction to audience node 270, and an instance of connection 118 returning audience response to parent audience node 263.

That same transaction, from the point-of-view of audience node 263 having just accepted audience node 263 as the leftmost child (seen from FIG. 2) is to cooperate with child node 270 to establish connection 272, which represents both an instance of connection 112 for delivering content and audience response to child node 270, and an instance of connection 132 for receiving audience response from child node 270.

Preferably, when attempting to join DHT ring 430, a new DHT node can attempt to optimize the position it takes in the audience hierarchy 410. For example, once DHT node 270" has joined DHT ring 430 and audience node 270 is attempting to find a parent, audience node 270 can determine that the audience node 263 corresponding to predecessor DHT node 263" is in the second row (which would place audience node 270 in the third row). In order to check for possibly more efficient (lower latency) in the audience, audience node 270 may query the audience nodes corresponding to other neighbor nodes on DHT ring 430. In this example, however, a query to audience node 270 corresponding to successor DHT node 240" finds that audience node 270 is in the first row, but that there are no child positions available (assuming the fanout of audience node 240 is limited to three). A query to other neighboring nodes (i.e., predecessors of predecessors, successors of successors, etc. around the DHT ring 430) find that they are either also in the second row, or that their fanout capacity has been filled. In the example of FIG. 4, an exception is found if new audience node 270 were to query engineer/server node 312, which only has two children. If this query had taken place before audience node 270 had given up the search and settled into a position with audience node 263 as parent, then audience node 270 might have joined audience hierarchy 410 as a child of engineer/server node 312 with the result that audience node 270 would be in the first row.

A variety of optimization techniques can be employed. For very large audiences, it is desirable for stations that are in close proximity on the physical network 320 to be close together in audience hierarchy 410, so that latencies can be minimized. This can be facilitated in some instances by employing the IP address of the stations on physical network 320 as the key a DHT node uses as its identity. For example, audience stations such as 263' and 270' connect to the same access equipment 350. To have the DHT nodes corresponding to stations 270' and 263' be adjacent in the DHT ring 430 would take advantage of the likely minimum latency found between those two audience nodes, relative to other audience nodes for which the routing would be more elaborate. Similarly, stations 242', 264', and 265' would be expected to have low mutual latencies, as would 240', and 260'-262'. While these groupings could occur by using empirical measurements of latencies among arbitrary numbers of previously joined DHT nodes when a new DHT node is joining, the knowledge that contiguous ranges of IP addresses are assigned to common companies, and that individual pieces of routing equipment are often provided with a subrange of addresses for which they are responsible and can assign dynamically. In particular, stations in the physical network 320 having IP addresses differing only in the last octet will be very likely to have low mutual latencies. This assumption can be further extended with data regarding which communications companies are assigned which address ranges, and what geographical regions those addresses are used. It becomes significantly more difficult to predict latencies between addresses assigned to two Internet service providers, as the routing between stations even within the same city may take a circuitous path half way across the country (e.g., one particularly surprising empirical experience was to discover that between the routing between one station in Boca Raton, Fla., and another in Deerfield Beach, just seven miles away, each station connecting through a different service provider, included a hop through a router in Dallas, Tex., making the one-way WAN connection extend over 2,200 miles—more than a factor of 300× greater than the geographic distance, which serves to emphasize the potential value of predicting inter-provider latencies). However, such routings can be slow to change and a high latency routing between two class C IP address ranges may be presumed to persist until observed otherwise. With that said, note that for this application, low latency is valuable for efficient management of DHT ring 430 but though valuable, less crucial for audience node interconnections such as 221, 223, 251-256, 272.

There is a formal algorithm by which well-behaved nodes leave the DHT ring 430, in accordance with Ghodsi. In the course of the leaving process, the audience node in audience hierarchy 410 that corresponds to the leaving DHT node in DHT ring 430 must extract itself from the audience hierarchy. When an audience node begins to leave the audio hierarchy 410, any immediate child nodes of the leaving node must be repositioned so as to remain attached to the audience hierarchy.

A simple procedure for restructuring the audience hierarchy as an audience node leaves is to always promote the leftmost child node into the position vacated by its parent. Thus a leaving parent's position is taken by the leftmost child vacating (for an instant) its position in the hierarchy, at which point the non-leftmost children of the leaving parent remain in place though now attached to the promoted leftmost child. Subsequently, the leftmost child of the leftmost child of the leaving parent is promoted to the position vacated by its parent, and so on. In this way, as a parent audience node leaves, its leftmost chain of descendents is promoted by one row. All other descendents remain in place. This method also has the property that each node that is changing its position in the hierarchy is moving forward one row. Thus, by merely increasing the size of any audio buffers (discussed in more detail below) used to manage content and preferably audience response signals, audience members 160 do not experience a discontinuity in audio signals.

In a slightly more elaborate version, rather than always selecting the leftmost child for promotion, the child having the shortest sub-hierarchy (in rows) can be selected for promotion. This has the advantage of helping to minimize the height of the audience hierarchy 410. One way to do this is to promote a first immediate child node of the leaving parent to the leaving parent's position. The remaining immediate children can be positioned as children (or later descendents) of that first child node. Once the new hierarchy positions have been planned, then the reconnections can be implemented, starting with immediate children taking the positions other than the leaving parent's position, and the first child node at the last replacing the parent.

Additional finesse can be exercised as an audience node leaves audience hierarchy 410. For example, if a leaving audience node has no children, there is the opportunity for a sub-hierarchy headed by an audience node in a higher numbered row to be promoted to the position being vacated by the leaving audience node. This too promotes minimizing the height of the audience hierarchy 410. Those skilled in the art will recognize the opportunity to apply many of the well-known algorithms for managing n-tuple trees, where such variations would fall within the intent of the present invention.

Preferably, an authentication step (e.g., a login with username and password, or a cookie) occurs between a station or its audience member and engineer/server node 220 prior to joining DHT ring 430 or audience hierarchy 410. In this way, if an audience node or DHT node misbehaves once or repeatedly, for example, by unceremoniously departing from DHT ring 430 without observing the appropriate steps for leaving the ring, or other problematic behavior, then the account to which the station or audience member is authenticated can be tagged as a 'problem member' and either be denied future participation, or be relegated to a position with lower disruptive potential (e.g., being put in the last row of a hierarchy).

Note here that some members of audience hierarchy 410 are leaf nodes, that is, they have no children: see audience nodes 260-262, 264-265, and 270. Such a situation is common as audience nodes are usually added to the outer portion of the hierarchy and don't initially have child nodes attached. However, this leaf node status might be enforced for stations that are detected to have bandwidth adequate only to support communication with the parent. Such a situation may occur with a wireless device, such as a network enabled cell phone. In this case, even though a device can't participate as a parent node for other audience nodes, there are always positions available within the audience hierarchy 220 that can accommodate a leaf node. In an audience hierarchy optimized for minimum depth, the fraction of nodes which can be leaf nodes approaches (1-1/fanout). As an example, for an audience hierarchy 230 wherein the non-leaf audience nodes have an average fanout of three, up to ⅔ of the nodes can be leaf nodes.

Figure 5:
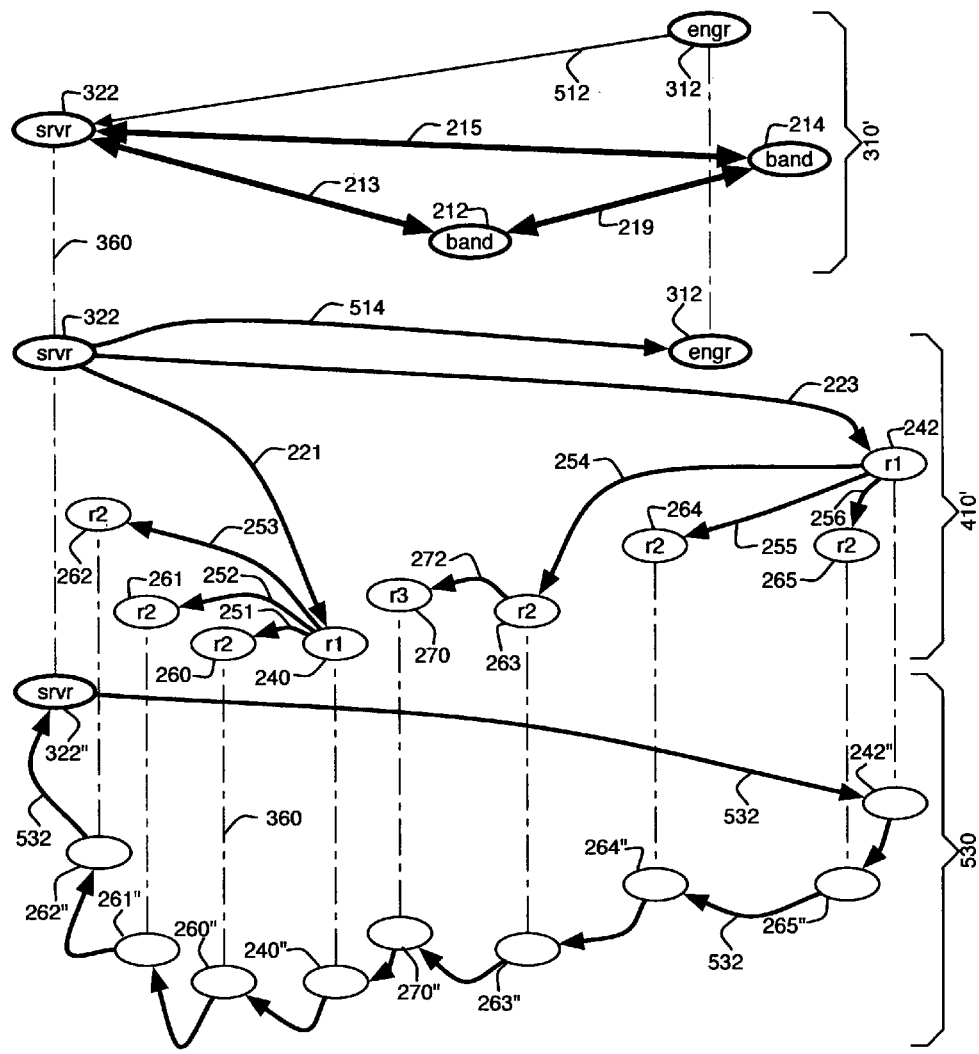
FIG. 5 shows the same underlying physical network topology, but with an alternative embodiment having a server anchor the organizational layer and audience hierarchy.

Referring now to FIG. 5, DHT ring 530, audience hierarchy 410', and performance nodes 310' illustrate an implementation where the functions of engineer/server node 220 are divided among the two physical stations 322', the server, and 312', the engineering station (both shown in physical network 320, entirely applicable to, but not shown in FIG. 5).

The configuration of successor pointers 532 in DHT ring 530 is similar to DHT ring 430, except that the anchor member is engineer/server node 322" rather than engineer/server node 312".

Similarly, engineer/server node 322 in audience hierarchy 410' takes the place of engineer/server node 312 in audience hierarchy 410, such that connections 221 and 223 to first row audience nodes 240 and 242 attach to engineer/server 322. An addition brought on by the separated roles of server and engineer is that server 322 needs to provide engineer station 312 with a signal representing audience response and preferably content using connection 514.

In performance group 310', server 322 receives the content of performance nodes 212 and 214 and provides the fanout of that content to the first row of audience nodes (which comprises audience nodes 240 and 242). An engineer (not shown) working through engineer station 312 sets mixing levels and manages recording through connection 512.

Alternatively, connections 213 and 215 can remain with engineer station 312 as shown in performance group 310, and then the engineer station 312 would provide the content to server 322.

As previously mentioned, the advantage of separating the server role from the engineer role of engineer/server node 220 is to rely on server 322 for a higher fanout than might otherwise be available from a the engineer's workstation 312.

Figure 6:
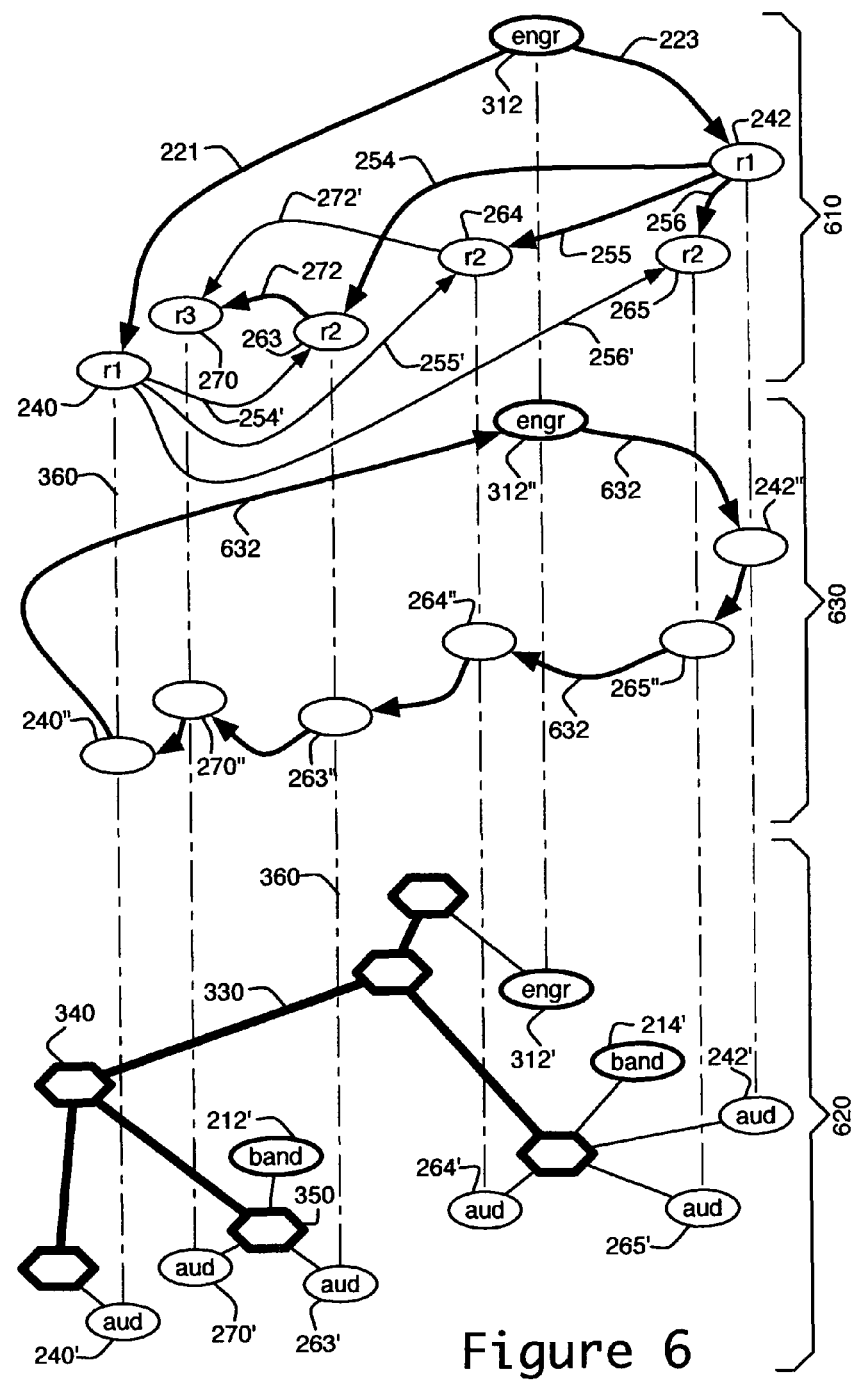
FIG. 6 shows an exemplary underlying physical network topology in relation to a hierarchy of audience nodes for audience members, wherein backup parent nodes are pre-established for rapid recovery.

Referring to FIG. 6, physical network 620 includes fewer audience members than in earlier figures. Accordingly, DHT ring 630 joined with successor pointers 632 is smaller. The smaller number of audience members used in the illustration is because fanout bandwidth of some audience members in audience hierarchy 610 has been allocated as a backup to other audience members in audience hierarchy 610, for use if a parent audience member fails, as opposed to allocating that fanout bandwidth exclusively to additional audience nodes.

Audience nodes in audience hierarchy 610, other than those in the first row, have an alternative to their respective parent connection 122 (from FIG. 1) for delivery of content. In audience hierarchy 610, in the third row, audience node 270 receives at least content from second row parent node 264 over connection 272. However, in case second row node 263 were to fail, another second row node 264 maintains backup connection 272' to third row audience node 270. Similarly connection 254' from first row node 240 serves as a backup for second row node 263 in case primary connection 254 from first row node 242 were to fail; as connection 255' is a backup for connection 255 and connection 256' forms a backup for connection 256.

Generally, engineer/server node 312 may be considered reliable and not subject to offerings of redundant connections. However, especially when splitting the roles of server/engineer node 220 into separate physical entities (as illustrated in FIG. 5), a redundant server node (not shown) may provide backup to first row children of server node 322.

Alternatively, a server node (not shown) may be provided that dynamically provides a replacement stream (not shown) in case a parent node unexpectedly fails. The switchover can be smooth and perhaps unnoticed by the audience member 160 corresponding to the audience node 110 whose parent 120 failed. Once the switchover has occurred, the system can find a new position within the audience hierarchy so that server bandwidth remains available as a backup for failures.

Those skilled in the art will recognize that backup links will be used infrequently and that, statistically, it is not necessary for a member node of audience hierarchy 610 reserving bandwidth for use as a backup connection to strictly allocate that bandwidth to precisely one other audience member. In an alternative embodiment, a given audience node may offer more backup connections than it can physically support and be relatively safe because it is statistically unlikely that all such backup connections will be needed at once.

As with primary connections 254-256 and 272 between audience nodes 263-265, and 270 and their respective parents, the backup connections 254'-256' and 272' to their respective backup parents can change dynamically as nodes join and leave DHT ring 630.

In an alternative embodiment, audience nodes might dynamically and continuously move to different parent nodes or exchange child nodes. In this way, continuous 'milling about' in the virtual auditorium can be simulated. Similarly, an explicit control in the user interface (not shown) would induce the local node 110 to relocate itself within audience hierarchy 220 and might be used, for example, to effectively change an audience node's position within audience hierarchy to move away from noisy or unruly neighbors in the audience hierarchy. Note that no corresponding change is required within DHT ring 430.

Such a technique of moving an audience node among other audience nodes in the audience network can be based upon an avatar's movement within a virtual world. In this embodiment, proximity in a virtual world of two avatars promotes an affinity between the two audience nodes corresponding to the two avatars, and those audience nodes would be migrated toward each other. In this way, the audience members corresponding to the two avatars could converse by shouting over the music in a nightclub simulation.

Note that audience hierarchy 410', minus the connection 514 and engineer node 312 (thus removing the engineer role), and minus the interaction with distributed performance 310', is simply a conference call, moderated by a distributed voice bridge managed by the DHT ring 530 or other peer-to-peer organizing mechanism and anchored by server 322. For such a distributed conference call, server 322 can be substituted for by another audience station (not shown) with its own audience member participating or moderating the conference call.

Note both here and in prior figures, that if the portion of the engineer/server that implements the role of server (elements 220, 312, 322 in FIGS. 2, 4, and 5, respectively) were to have a fanout sufficient for every audience member to be in the first row, then the server is a centralized voice bridge and may be implemented as a voice bridge of the prior art. In this alternative embodiment, such a voice bridge implements a conference call, which may or may not have unmanaged latencies, to which a distributed performance of the prior art having tightly managed latencies, has been connected.

Figure 7:
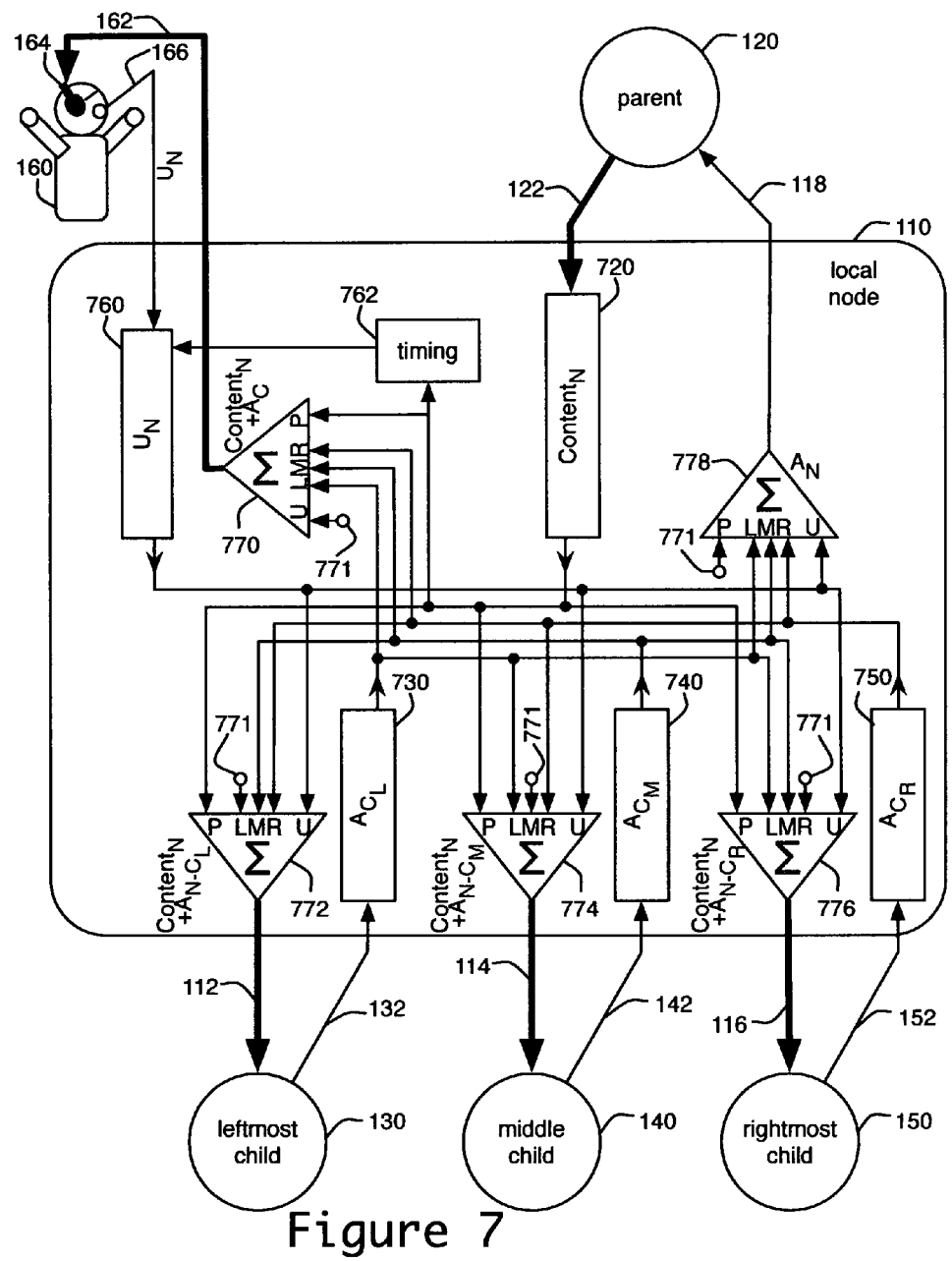
FIG. 7 is a detailed schematic of signals within an audience node.

FIG. 7 shows an exemplary implementation of an audience node 110.

In this example, separate channels of content are not shown, but might be considered to be stereo, 5.1 surround sound, or to include video. Similarly, connections 122, 112, 114, and 116 conduct both content and audience response, which may be implemented as separate signals over the corresponding connections, but for the simplicity of illustration and as a preferred embodiment, the bandwidth-conserving implementation where content and audience response is combined into a common signal is shown.

Content and audience response from parent 120 arrives on connection 122 and is collected in buffer 720. There are four other buffers: buffers 730, 740, and 750 collect audience response from child nodes 130, 140, and 150, respectively; and buffer 760 collects audience response from audience member 160.

Each mixer 770, 772, 774, 776, and 778 combines signals for delivery to the audience member 160, the child nodes 130, 140, 150, and the parent node 120, respectively. In this diagram, each mixer is shown with five inputs, U, L, M, R, and P, corresponding to signals sourced by the audience member, left, middle, and right child nodes, and the parent node. Each mixer preferably has a different one of its inputs set to null 710, always corresponding to the signal from the entity to which the mixer's output will be provided. For example, content and audience response from buffer 720 is distributed to mixers 770, 772, 774, 776, but not to 778, as made clear by null input 771 on mixer 778. This configuration helps to minimize feedback.

In the preferred embodiment, each mixer operates to produce a single signal, which may be in stereo, wherein the input components are combined and cannot subsequently be separated. However, many alternative embodiments of mixers 772, 774, 776, 778 can operate as multiplexers such that one or more of the input components remains distinct and separately manageable from the others. In such an alternative embodiment, demultiplexers (not shown) are used at the remote nodes 120, 130, 140, and 150, and in conjunction with receive buffers 720, 730, 740, and 750, as needed. Such a multiplexer/demultiplexer can take the form of interlacing the distinct signals over the same connection, or by creating multiple, parallel connections (not shown). For example, if the signal comprising the audience response and the content from the parent node 120 over connection 122 were to preserve the distinction, then mixer 722 could provide a similar distinction for connection 112 to child 130, since it has access to an unadulterated content signal and is able to mix other audience responses available to node 110 with the audience response signal from parent node 120.

In the preferred embodiment, the signal from buffer 720 can be examined by timing control 762 when advanced to mixer 770. Timing control 762 extracts timing information such as a timestamp, a frame number, sample number, etc. so that the signal collected by buffer 760 from audience member 160 can be correspondingly marked or tracked. In this way, all responses from all audience members are associated with a position within the content signal. For example, at the onset of a performance, a band may open with a widely recognized-riff. Audience members may react with audible sighs or applause expressing recognition and anticipated pleasure of the piece just beginning. By marking the audience response in buffer 760 with the timing signal, outbound mixers 772, 774, and 776 can combine content from buffer 720 with local audience response from buffer 760 so that the synchronization between the performance and the audience response is preserved. Note that it is not necessary for content from buffer 720 to be delivered to mixer 770 at the same time as to mixers 772, 774, and 776. A preferred embodiment is to select a modest inter-row latency to be established between two consecutive rows in audience hierarchy 230, for example, 100 mS. The latency of connection 122 can be measured as described in the prior art (including the '926 patent) and subtracted from the selected inter-row latency to provide a delay time by which, on average, the inbound signal from connection 122 is delayed in buffer 720 before advancing to mixers 772, 774, and 776. In order to be synchronized with the audience response signal collected in buffer 760 from audience member 160, the content from buffer 720 might only be delayed by 80 mS before presentation to mixer 770 so that enough audience response is collected in buffer 760 to mix with precise synchrony with content from buffer 720 at mixers 772, 774, and 776.

Preferably, the inter-row latency is kept below one second because longer latencies are expected to disrupt the perception of 'real time'. However, with extremely widespread connections (e.g., audiences that span the globe) or for communications channels that employ satellite links, such latencies may be unavoidable.

Preferably, an echo detection system (not shown) examines the contents of buffer 760 and earlier contents of buffer 720. A correlation between the two buffer contents would represent the degree of feedback formed if transducer 164 in-use by audience member 160 comprised audio speakers instead of audio headphones, or if the headphones set so loud as to be detected by the microphone comprising input 166. Such an echo detection system could mute the contents of buffer 760, or preferably perform echo cancellation upon buffer 760 (not shown). Many implementations of echo cancellation algorithms and circuitry are well-known in the art. Such an echo cancellation system (not shown) of the prior art can substantially eliminate that component of the signal on input 166 caused by transducers 164, leaving the signal to be substantially comprised of the response from audience member 160. Further, those skilled in the art may choose to employ techniques such as noise gating, squelch, automatic muting, or the like in cases of high background noise on input 166.

An advantage of establishing a inter-row latency value is that an audience node moving from one parent (who may be leaving the DHT ring) to a new parent will have less difficulty receiving a continuous content stream since any candidate new parent in the same row as the original (leaving) parent will have substantially similar content available in buffer 720 which can be received without disruption for the audience node switching parents, or that audience node's dependents.

Each buffer, especially buffer 720, should also retain signals for several additional inter-row latency periods. This is valuable when an audience node from more than one row back becomes a child of an audience node. Rather than skipping one inter-row latency period of content for each row a child has moved forward, the child can effectively remain in the same row and hear a substantially contiguous content stream, even though attached as a child of a parent more than one row ahead in audience hierarchy 220 (this configuration is not shown in the Figures). In such a case, for the purposes of balancing the hierarchy, the audience node that is maintaining a latency several rows behind its new parent will retain its old row number. An optimization that works to resist the total latency of the system from growing as audience nodes leave and others join the hierarchy, is for an audience node that is more than one row removed from its parent node should be migrated to a different parent node not so many rows ahead, if the opportunity arises.

Also, if an audience member connects to a parent with the result of connection 122 having a high latency, higher than the inter-row latency, then the audience member preferably receives a higher row designation such that a target of two or more times the inter-row latency can be met reliably. If the audience member changes parents and the latency of new connection 122 to the new parent is less, the higher row designation preferably stands so that no skip occurs in the content provided to that audience node's audience member 160 or to the child nodes.

Preferably, an audience member is not moved backward to a higher numbered row, as this will cause a repeat in the content performance of a duration equal to the inter-row latency, unless there was an excess delay provided by buffer 720.

It is not necessary that all inter-row latencies be the same size, though it is preferably that all the latencies between two specific rows be the same to make transitions easier.

If there are occasional connections whose actual transport latencies cause an inter-row latency budget to be exceeded, there are techniques which can mitigate this. For example, suppose the inter-row latency budget is predetermined to be 100 mS. A parent node provides content to a particular audience node with an actual transport latency of 90 mS. An additional 20 mS of latency may be reserved by the buffer to ensure that the jitter in delivery times over the connection 122 is unlikely to cause the buffer to run empty. This totals 110 mS, which exceeds the inter-row latency. However, if the implementation of local node 110 supports unequal inter-row latencies, then even through the connection from its parent runs 10 mS over the inter-row latency budget, it can still operate with children having an under-budget latency, for example, on connection 112 the budget of 100 mS minus the 10 mS overage on connection to the parent's minus a 20 mS jitter-safe buffering reserve, suggest that a connection to a child having an actual transport latency of 70 mS or less would be fine, thus mitigating the overage.

Note that the entire notion of homogenizing inter-row latency (at least between any two rows, if not across the whole hierarchy) is merely a convenience for smoothly changing connections between two parents, not a requirement. If inter-row latency is not homogenized, the next preferred implementation is where inter-row latency is quantized (e.g., multiples of 100 mS). But even that is not strictly required. As long as buffer 720 gathers at least enough signal to protect from likely jitter in connection 122 so that the buffer is unlikely to run empty and produce a situation where mixer 770 runs out of content signal P to be provided to the audience member 160 via output 162, then that buffer latency is sufficient. The '926 patent teaches methods of covering the loss in cases where the input buffer 720 does run out of data because content was lost or delivered too late.

Figure 8:
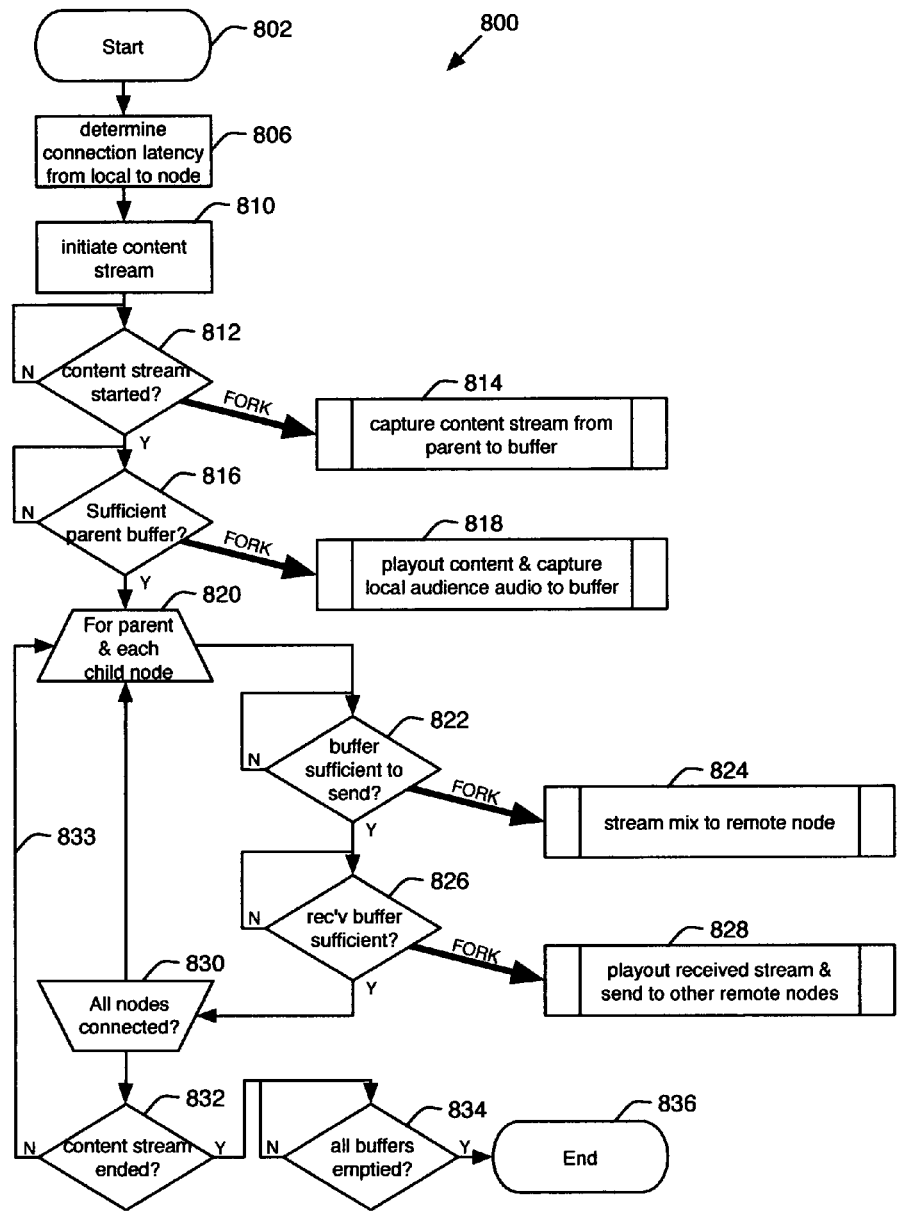
FIG. 8 is a flowchart of the operation of an audience node.

Exemplary station 270' on physical network 320 executes audience node process 800, shown in FIG. 8. During start step 802, station 270' will attempt to become an instance of audience node 110. Preferably by contacting server 322', authenticating to an account known to server 322' and which may be associated with station 270' or member 160, and selecting one of the available performances known to server 322' whether automatically in accordance with the authentication, or manually by audience member 160, or a combination of thereof. With performance 310 selected, server 322' directs station 270' to contact to at least one node in audience hierarchy 230. Preferably this contact is mediated by a self-organized overlay network, such as DHT ring 430; but alternatively may be managed by server 322' or engineer/server node 220. In the case of being directed to the DHT ring 430, station 270' queries and joins DHT ring 430 as DHT node 270". Thereafter, using its connections as DHT node 270", station 270' can contact neighbors 240" and 263" on the DHT ring 430 and join audience hierarchy 230 as audience node 270, which is finally an instance of audience node 110.

It should be noted here that in step 802, when authenticating to an account, the account can represent a membership account, which may be subject to a subscription or event fee whereby a potential audience member 160 is seen to have paid for access to the presentation. Alternatively, authenticating to an account may reference a financial account, for instance a credit card, which might be charged directly for the service or for the presentation to which access is sought.

Once a member of audience hierarchy 230, audience node 110 preferably iterates over its parent and child nodes in audience hierarchy 230 to determine latencies of connections 112, 114, 116, 118, 122, 132, 142, 152. This occurs in step 806. The latency to an remote node is measured, preferably by measuring a round-trip time (RTT) for example through connection 118 to parent node 120 and back over connection 122, and dividing by two. The result is the expected latency for both connections in the round-trip, and is expected to be symmetrical absent other information about the connections. Preferably more than one measurement is taken, to lower the noise in the measurement and characterize jitter (fluctuations in latency), and though not shown in FIG. 8, the measurement process can continue in parallel throughout process 800 as a background task, so as to keep audience node 110 abreast of changes in network traffic. Similar measurements can be made and maintained with respect to alternative or backup connections (e.g., connection 272' in FIG. 6) to allow audience hierarchy to anneal its structure to become more stable and/or more optimized. Once connection latencies are characterized satisfactorily, the process continues to step 810.

If any latencies have been found to be too large, audience node 110 may try to relocate within audience hierarchy 230 (not shown). Contact with other nodes can be initiated through DHT ring 430 or other organizing entity, e.g. server 322' or engineer/server 220. However, a high latency may be addressed as previously described, by simply accepting it, and preferably incrementing the row number of audience node 110 until the measured latency is less than the increment times a predetermined inter-row latency.

Once latency has been determined, a stream from the parent 120, which in this example is audience node 263, is initiated. The progress of initiating the stream is monitored in step 812 and once the stream begins over connection 272, an ongoing capture process 814 is spawned and proceeds to receive that stream into buffer 720.

With the parent stream on connection 272 initiated, buffer 720 is monitored in step 816. Once buffer 720 is sufficiently filled given the latencies measured and expected worse-case jitter (which may be simply summarized as a predetermined amount of captured signal in buffer 720), process 818 is spawned to transfer the data captured in buffer 720 to playout to audience member 160 through mixer 770 and output 162. In so doing, audience response from audience member 160 through input 166 is captured in buffer 760, preferably in substantial synchrony with the playout. If necessary, echo detection, and mitigation (e.g., by muting) or cancellation occurs here.

At this point, a loop beginning at step 820 initiates the stream for each attached remote audience node (i.e., parent and child nodes). Step 822 is performed with respect to the parent node 120 by monitoring the content of buffer 760. When the amount of buffered signal is sufficient considering expected latencies and jitter, process 824 is spawned to stream the output of mixer 778 over connection 118. Step 826 is skipped with respect to parent node 120.

The loop iterates at step 830, returning for each attached child node. An attached child node will have successfully completed its performance of process 800 through step 810, as a child (e.g., 130) of the present audience node, it has the present audience node connected as its parent. The present audience node repeats step 822 now with regard to child node 130 monitoring buffer contents in buffer 760. Once determined that the contents of buffer 760 are sufficient to accommodate expected combined jitter and latencies of connections 122 and 112, process 824 is spawned to operate mixer 772 and start the stream over connection 112.

With regard to child node 130, processing continues at step 826, where a stream initiated by child node 130 in its performance of step 822 relative to its parent (the present audience node) results in a stream arriving over connection 132 and beginning to fill buffer 730. In step 826, the present audience node monitors the contents of buffer 730 for sufficiency given known latencies and jitter. Once step 826 has considered child buffer 730 to be sufficient, the contents of buffer 730 are allowed to be used by mixers 770, 774, 776, and 778, whereas before, the contents of buffer 730 were withheld from those mixers.

As the contents of buffers 720, 730, 740, 750 and 760 become available, they are mixed either synchronously or with a fixed offset, for example, the predetermined inter-row latency by mixers 770, 772, 774, 776, and 778.

Note that this loop will iterate for each child node added, even if the child nodes are added later, as shown by the ongoing maintenance control flow 833.

Further, if a stream falters or fails, an affected mixing process 824 will mute the corresponding mixer input until the stream stabilizes or is re-established, which may be through a recurrence of step 822 with respect to the faltering or failed node.

With all streams running, process 800 checks in step 832 for the end of the performance. If the performance is not ended, process 800 preferably includes a maintenance loop 833, by which mixes for recently added child nodes can be initiated, or faltering nodes can be re-engaged.

When the performance ends, control passes to step 834, which waits until all mixers have exhausted each buffer they use. This ensures that all members of audience hierarchy 230 and the engineer/server 220 have the opportunity to receive not only the complete performance, but also the complete audience response.

Once each mixer has finished, process 800 can conclude at step 836, wherein any persisting processes spawned can be terminated and buffer resources released.

In an alternative embodiment, before buffer 760 is released or purged, a high quality copy of the buffer contents can be immediately sent or saved and later uploaded to server 322', for example using the file transfer protocol FTP. For this high quality copy of the buffer, a different, higher quality, higher bit rate CODEC may be used. Subsequently, a high quality mix of the aggregate audience response can be created from the uploaded audience responses. When combined with recordings made in accordance with recording techniques as taught in '926, a high quality recording of a 'live' performance can be produced.

Note that in an alternative embodiment, there need be no strict precedence between the start of the stream on connection 122 as detected in step 816 and the capturing and transmission of the stream captured from input 166. Absent a desire to ensure that the audience response acquired from input 166 is maintained in synchrony with the stream on connection 122, as long as a buffer is sufficiently full as to substantially mitigate the expected effects of latency and jitter, the buffer contents can be made available to mixers 770, 772, 774, 776, and 778 as appropriate, and streamed to remote nodes.

Not shown, but a portion of maintenance loop 833 is the maintenance of audience hierarchy 230 as neighboring nodes leave, including migration to lower numbered rows or lateral or more dramatic moves needed to switch parents, discussed earlier. Changes to audience hierarchy are preferably initiated as a result of typical (and well known) DHT ring 430 'leave' and 'ring maintenance' algorithms, not shown here, taught by Ghodsi.

For use with pre-recorded content, no performance group 210 is needed. The pre-recorded content can be supplied by engineer/server node 220 and distributed through audience hierarchy 220.

For use as a conference calling technology, no performance group 210 is used. The computer of the call organizer is preferably used as the engineer/server node 220, or as described above, the roles of engineer and server can be divided, as between nodes 312 and 322 as discussed in conjunction with FIG. 5.

Various additional modifications of the described embodiments of the invention specifically illustrated and described herein will be apparent to those skilled in the art, particularly in light of the teachings of this invention. It is intended that the invention cover all modifications and embodiments which fall within the spirit and scope of the invention. Thus, while preferred embodiments of the present invention have been disclosed, it will be appreciated that it is not limited thereto but may be otherwise embodied within the scope of the following claims.

We claim:

1. A first station for use in a virtual auditorium, in which the first station is a first node, the first station comprising:
    an input, said input accepting a first signal comprising audio from a participant;
    a connection to a network, said first station having a configuration to communicate with at least a second and third node through said network;
    an output, said output presenting to said participant at least a portion of a second signal comprising audio, the second signal received from the second node, said output further presenting to said participant at least a portion of a third signal comprising audio, the third signal received from the third node; and,
    a mixer, said mixer providing a fourth signal representative of at least the first and second signal, said first station sending the fourth signal to the third node, said mixer providing a fifth signal representative of at least the first and third signal, said first station sending the fifth signal to the second node;
    wherein the configuration represents the position of the first node as being directly connected to the second and third nodes in a hierarchy and is provided by an organizing entity comprising a structured overlay network of which the first node is member, the structured overlay network comprising a distributed hash table, the configuration based on a query of the distributed hash table; and,
    one of the second and third signals comprises at least a portion of a sixth audio signal from a fourth node in the hierarchy that is not directly connected in the hierarchy to the first node.

2. The station of claim 1 wherein said input comprises a microphone and said output comprises at least one selected from the group of a headphone and a speaker.

3. The station of claim 2 wherein said input comprises a coder and said output comprises a decoder.

4. The station of claim 3 wherein said decoder comprises at least one CODEC selected from the group consisting of MP3 and AAC.

5. The station of claim 3 wherein said decoder comprises a CODEC optimized for VoIP.

6. The station of claim 3 wherein said second signal comprises an audio signal coded compatibly for said decoder.

7. The station of claim 6 wherein said second signal is stereo.

8. The station of claim 3 wherein said second signal is stereo.

9. The station of claim 2 wherein said second signal is stereo.

10. The station of claim 1 wherein said fourth signal comprises a copy of said second signal.

11. The station of claim 1 wherein said fourth signal comprises a sum including an attenuated copy of said second signal.

12. The station of claim 11 wherein said first signal is included in said sum.

13. The station of claim 1 wherein a latency between said second signal and said fourth signal is less than one second.

14. The station of claim 1 wherein a latency between said first signal and said fourth signal is less than one second.

15. A virtual auditorium comprising a plurality of stations of claim 1, wherein the configurations corresponding to each of said plurality of stations collectively produce an interconnection of said plurality of stations such that said first signal produced at any one of said plurality of stations is represented in the output corresponding to substantially every other one of said plurality of stations.

16. The virtual auditorium of claim 15, wherein said interconnection is a conference call.

17. The virtual auditorium of claim 15, wherein the first signal corresponding to a one of said plurality of stations comprises a performance and the corresponding output represents an audience response to said performance.

18. The virtual auditorium of claim 17, wherein said performance comprises a distributed performance.

19. The virtual auditorium of claim 15 wherein the configuration is provided through the network by an organizing entity that charges a fee.

20. The virtual auditorium of claim 15 wherein the configuration is provided through the network by an organizing entity that verifies that at least one of said participant and corresponding station has a subscription.

21. The virtual auditorium of claim 15 wherein said interconnection is the hierarchy.

22. The virtual auditorium of claim 15 wherein each configuration of each of said plurality of stations is based on the position in a virtual world of a corresponding avatar.

23. A method for providing a virtual auditorium comprising steps of:
    a) providing a first station to a participant, the first station having an input, an output, and a connection to a network;
    b) joining a structured overlay network having a plurality of stations, the structured overlay network comprising a distributed hash table;
    c) configuring the first station with the structured overlay network for communication with a portion of the plurality of stations based on a query of the distributed hash table, the portion of the plurality of stations being directly connected to the first station in a hierarchy;

d) capturing a first signal from the participant with the input;

e) sending at least a portion of said first signal to each directly connected station;

f) receiving a corresponding second signal from each directly connected station, one of the second signals comprising at least a portion of a third signal received by the corresponding second station from a third station not directly connected to the first station in the hierarchy;

g) providing at least a first portion of each second signal to the participant with the output;

h) only when the first station is configured as a non-leaf node in the hierarchy, forwarding from the first station at least a second portion of each second signal to each of the correspondingly different directly connected stations; and, wherein the sending (e) of the first signal and forwarding (h) of the second signals by the first station is together as a mix corresponding to each directly connected station;

whereby when steps a)-h) are performed with respect to each participant the hierarchy produces the virtual auditorium.

24. A method for performing to a remote audience comprising the method of claim 23, wherein the signal captured in step d) at a first station is a distributed performance and the signal received in step g) at the first station is a response by the remote audience.

25. A second station for use in the virtual auditorium of claim 1, in which the second station is a fifth node, the second station comprising:

a second connection to the network, said second station configured as being directly connected a sixth node in the hierarchy and to communicate with the sixth node;

a second output for presenting to a second participant an eighth signal comprising audio received from the sixth node;

whereby said fifth node is a leaf node in the virtual auditorium.

26. The second station of claim 25, further comprising:

a second input, said second input accepting a seventh signal from the second participant, said second station sending said seventh signal to said sixth node.

27. The second station of claim 25 wherein the fifth node is the fourth node, the sixth node is the third node, the sixth signal is the seventh signal, and the eighth signal comprises at least a portion of the fourth signal, wherein the eighth signal is mixed by the third node.

28. The second station of claim 25 wherein the sixth node is the first node and the eighth signal comprises a mix of the first, second, and third signals.

29. The virtual auditorium of claim 21, in which, with respect to each first node, the second node is a parent to the first node, and the third node is a child of the first node.

30. A non-transitory computer-readable medium encoded with a computer program usable by the station of claim 23 for performing steps b), c), d), e), f), g), and h).

31. A method for providing a virtual auditorium for a plurality of participants comprising:

a) connecting a first computer to a plurality of second computers through a structured overlay network, the structured overlay network comprising a distributed hash table, the connecting based on a query of the distributed hash table, said first computer comprising an input for capturing audio from a first participant as a first signal, and an output for presenting audio to the first participant;

b) configuring the first computer in a hierarchy managed using the structured overlay network to provide the first signal to at least one second computer related to the first computer as one of a parent and a child in the hierarchy;

c) receiving a second signal from the at least one second computer;

d) presenting the second signal to the first participant with the output;

e) forwarding the second signal to each other second computer when the first computer is a non-leaf node in the hierarchy;

wherein the second signal comprises at least a portion of a third signal from a third computer, the third computer not related to the first computer as one of a parent and a child in the hierarchy.

32. A non-transitory computer-readable medium encoded with a computer program for execution by the first computer to perform steps b), c), d), and e) in the method of claim 31.

* * * * *